US006490278B1

(12) United States Patent
Michelson et al.

(10) Patent No.: US 6,490,278 B1
(45) Date of Patent: Dec. 3, 2002

(54) METHOD AND APPARATUS FOR SIGNALING VOICE COMPRESSION IN A NETWORK

(75) Inventors: Steven M. Michelson, Freehold, NJ (US); Joshua Hal Rosenbluth, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/166,801

(22) Filed: Oct. 6, 1998

(51) Int. Cl.[7] .............................................. H04L 12/56
(52) U.S. Cl. .................................... 370/389; 370/395.1
(58) Field of Search ................................ 370/389, 390, 370/399, 400, 401, 395, 465, 351, 352, 466, 467, 471, 474, 476, 395.1, 395.52, 395.51, 395.5, 395.6, 395.7, 395.71; 375/222, 240.02, 145

(56) References Cited

U.S. PATENT DOCUMENTS 5,889,863 A * 3/1999 Weber ......................... 380/25
6,078,958 A * 6/2000 Echeita et al. .............. 709/226
6,119,105 A * 9/2000 Williams ..................... 705/39

OTHER PUBLICATIONS

International Telecommunication Union, General Aspects of Digital Transmission Systems; Terminal Equipments; Recommendation G. 726, Geneva, 1990.

Functional Description of the Integrated Services Digital Network (ISDN) User Part, Chapter T1.113.1, ANSI T1.113–1995.

* cited by examiner

Primary Examiner—Dang Ton

(57) ABSTRACT

The present invention provides a method of transmitting a data signal across an intermediate network. The intermediate network receives a compression control signal associated with the data signal that provides information about the compression format of the data signal. The intermediate network uses this information to determine whether and where to transcode the data signal within the intermediate network. The data signal is then transmitted across the intermediate network, and transcoded as determined.

31 Claims, 4 Drawing Sheets

METHOD AND APPARATUS FOR SIGNALING VOICE COMPRESSION IN A NETWORK

BACKGROUND OF THE INVENTION

As telecommunications technology advances, and as the market for this technology expands, demand for bandwidth in networks is rapidly increasing. This bandwidth may be scarce or expensive. As a result, there is motivation to use as little bandwidth as possible for any given connection. One way to minimize the bandwidth used for a connection is to compress the data signals transmitted along the connection using standard compression algorithms. Such compression makes additional bandwidth available for additional connections. Compression may be performed on a wide variety of data signals, including but not limited to multimedia signals such as voice, video, and facsimile. Each time a signal is compressed and decompressed, some data may be lost, and the quality of the signal may be reduced. A single compression and decompression does not usually result in noticeable signal degradation. However, if a given data signal is compressed and decompressed multiple times, a scenario referred to herein as "tandem encodings," there can be significant and noticeable degradation in the quality of the data signal.

Compression is particularly important in certain contexts, such as where bandwidth is scarce or expensive. For example, wireless transmissions require bandwidth on the wireless spectrum, which is available in limited amounts, and is increasingly expensive. As a result, voice transmissions over the wireless spectrum are typically compressed by a factor of 8:1 or more. Also, bandwidth is typically expensive on international networks, such that compression can lead to significant savings. Personal computers may not be able to handle bit rates above a particular bit rate. For example, 64 kB speech signals are presently beyond the capabilities of many personal computers, and speech signals to or from such a computer may be compressed by a factor of about 10:1. A data signal may also be compressed for storage in a device that has limited capacity. For example, voicemail is typically compressed by a factor of about 4:1 for storage in customer premises equipment (CPE). Answering machines may similarly compress voice signals to increase the capacity of the memory in the device.

Voice signals are sometimes compressed for transmission across a network. Depending on the algorithm used, there may be little or no perceptible degradation of voice quality when compared to the uncompressed 64 kbps pulse code modulation (PCM) format used in conventional telephone networks. However, there is frequently significant degradation of voice signals that have undergone tandem encoding. Thus, while it may be beneficial to compress a voice signal if bandwidth is scarce, care should be taken to avoid tandem encodings.

Moreover, the networks of different carriers are being interconnected with increasing frequency. For example; long distance carriers may be interconnected with local telephone networks, such that the voice signal of a long distance telephone call is typically transmitted from the caller, across the caller's local telephone network, across a long distance carrier's network, across the called party's local telephone network, to the called party. While a given network may desire to minimize the use of bandwidth by compressing data signals, there is a risk of tandem encodings because the data signal may have previously been compressed by another network or another node within the given network. There is therefore a need for procedures to communicate, between networks and between nodes within a network, whether a data signal has been compressed, and if so, the type of compression.

Existing technology enables networks to transmit data signals to other networks, and existing signaling protocols allow the networks to communicate with each other about the data signals. Under the Broadband ISDN User Part (B-ISUP) protocol, for example, a first asynchronous transfer mode (ATM) network (1) transmits to a second ATM network an Initial Address Message (IAM) that indicates the final destination of the data signal; (2) receives an Address Complete Message (ACM) from the second network that indicates that a virtual circuit has been reserved, and the called party is being alerted; and (3) transmits the data signal after the called party answers, and the virtual connection has been established. There are many other protocols having similar procedures. For example, the PNNI protocol has an analogous procedure where SETUP and ALERTING messages replace the IAM and ACM, respectively. However, existing signaling protocols do not indicate whether and how a data signal has been compressed.

In a circuit-switched network, the bandwidth allocated per connection is either fixed or an integral multiple of some "base" rate. For example, in a typical circuit-switched voice network in the United States, -connections are established in 64 kbps slices, though they could, in theory, be established as super-rate connections (i.e., as integral multiples of 64 kbps) or sub-rate connections (i.e., using a "base" rate of less than 64 kbps). Even if a connection in such a typical network only requires 6 kbps of bandwidth, it would reserve a full 64 kbps of bandwidth through the network. As a result, compression does not necessarily reduce the use of bandwidth in a circuit-switched network.

In a packet network, the allocation of bandwidth to connections is continuously variable, and bandwidth usage may be finely controlled on a per-connection basis. As used herein, the term "packet" refers to either a variable length packet or a fixed length cell. In a connectionless packet network, such as a transmission control protocol/Internet protocol (TCP/IP) network, the term "connection" is used herein to represent the transmission of packets comprising the data signal between two users across the network, possibly via a variety of different paths. As a result, a connection in a packet network ideally uses only the amount of bandwidth actually required. For example, a service that requires 6 kbps of bandwidth only reserves 6 kbps of bandwidth through a packet network, whereas the same service in a typical 64 kbps circuit-switched network would reserve 64 kbps. As a result, compression is usually beneficial in a packet network, because any bandwidth saved by compressing the data signal transmitted over one connection can be used for other connections. Bandwidth can therefore be used more efficiently in a packet network than in a circuit-switched network. Asynchronous transfer mode (ATM) networks and TCP/IP networks are examples of packet networks. The need for procedures to communicate compression information is therefore particularly acute when one or more packet networks are involved, because such information would allow more efficient use of bandwidth without signal degradation.

SUMMARY OF THE INVENTION

The present invention provides a method of transmitting a data signal across an intermediate network. The intermediate network receives a compression control signal associated with the data signal that provides information about the compression format of the data signal. The intermediate network uses this information to determine whether and where to transcode the data signal within the intermediate network. The data signal is then transmitted across the intermediate network, and transcoded as determined. As used herein, the term "transcode" refers to the process of converting a signal from one (possibly compressed) format to another.

The present invention further provides another method of transmitting a data signal across an intermediate network. The intermediate network receives a first compression control signal from an originating entity that provides information about a first compression format in which the originating entity communicates with the intermediate network. The intermediate network also receives a second compression control signal from a terminating entity that provides information about a second compression format in which the terminating entity communicates with the intermediate network. The intermediate network uses the information provided by the first and second compression control signals to determine whether and where to transcode the data signal within the intermediate network. The intermediate network then transmits the data signal across the intermediate network, between the originating entity and the terminating entity, transcoding as determined.

The present invention further provides, in an entity, a method of transmitting a data signal between the entity and an intermediate network. The entity transmits a compression control signal, associated with the data signal, to the intermediate network. The compression control signal provides information about a compression format in which the entity communicates with the intermediate network. The data signal is then transmitted between the entity and the intermediate network in the compression format.

The present invention further provides an intermediate network adapted to transmit a data signal between an originating network and a terminating network. The intermediate network has an intermediate access switch connected to an originating switch of the originating network via a first link, and an intermediate egress switch connected to the intermediate access switch by a connection within the intermediate network, and connected to a terminating switch of the terminating network via a second link. The intermediate network is adapted to receive a compression control signal associated with a data signal, the control signal providing information about the compression format of the data signal. The intermediate network is further adapted to determine whether and where to transcode the data signal within the intermediate network, based on the compression control signal. The intermediate access switch is adapted to transmit the data signal between the intermediate access switch and the originating switch via the first link. The intermediate network is adapted to transmit the data signal across the intermediate network, transcoding the data signal as determined. The intermediate egress switch is adapted to transmit the data signal between the intermediate egress switch and the terminating switch via the second link.

The present invention further provides a switch adapted to practice the methods of the invention, and a medium that stores instructions as to how to practice the methods of the invention.

DETAILED DESCRIPTION

Figure 1:
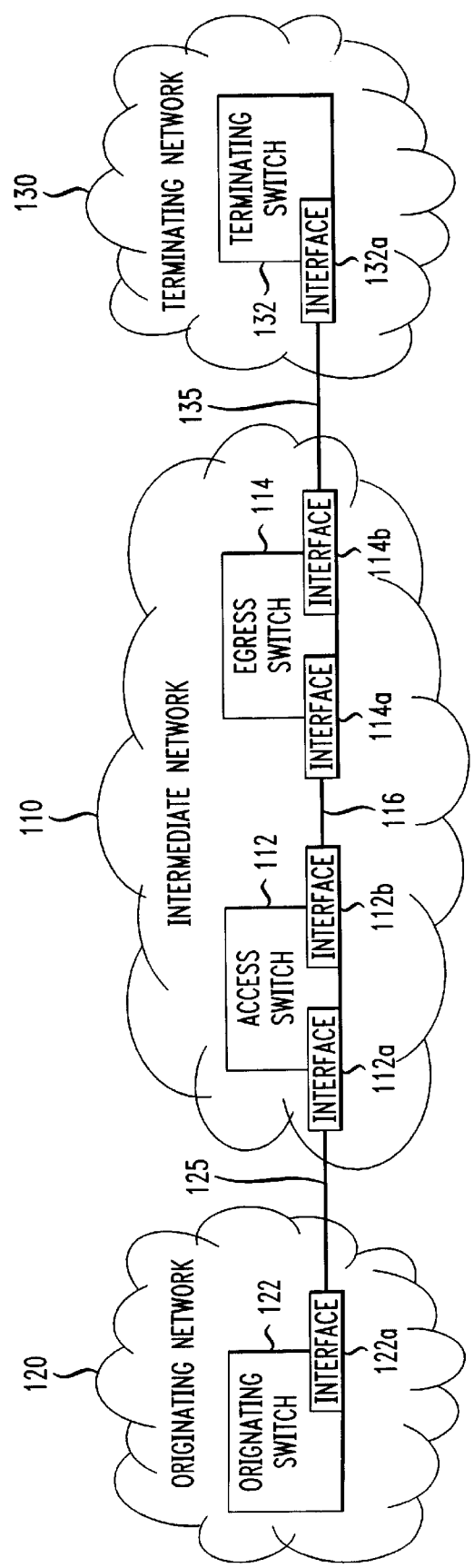
FIG. 1 shows a network architecture in accordance with an embodiment of the present invention.

The present invention allows communication between switches, whether they are in the same network or different networks, as to the "compression format" of a data signal, i.e., whether the data signal is compressed, and, if so, which standard algorithm is used. The term "compression format" as used herein includes both "compressed" and "uncompressed" formats. Preferably, this communication occurs through a "compression control signal" associated with the data signal. The compression control signal may be in-band, such as a header on a data signal, or out-of-band, such as a separate signal on a separate connection. Preferably, the compression control signal is included in control signals that initially set up network connections over which the data signal will be transmitted, and is implemented by modifying the existing control signal protocols of a given network. A "data signal" may be bidirectional. For example, a single data signal may carry all of the voice and/or other data of an entire telephone call.

The compression control signal allows a network to efficiently use bandwidth by making informed decisions regarding compression, such as whether and where to compress a data signal. Whether a data signal is compressed may affect the bit rate at which the data signal is transmitted over a connection, which in turn affects the amount of bandwidth used by the connection. In particular, the switches of a network can determine whether and how a data signal has been compressed, and use this information to decide whether and how the data signal should be transcoded before transmission to the next switch in the connection.

As used herein, the term "switch" refers to any type of node used in any type of communications network. For example, the term "switch" includes the routers of a TCP/IP network, and the switches of an ATM network. The term "link" refers, in a very broad manner, to a physical link between two switches, typically but not necessarily a direct link. The term "interface" refers to the part of a switch to which a link connects. The interface is the part of the switch that determines the format of signals sent over the link. The term "connection" refers, in a very broad manner, to a virtual link between two switches, which may traverse a plurality of intermediary switches and physical links, not necessarily within the same network. A signal is transmitted along one or more connections, and a connection is carried by one or more links, such that a signal transmitted from one switch to another may traverse a plurality of intermediary switches along the way.

As used herein, "intermediate network" refers to a network used to carry a data signal between an "originating entity" and a "terminating entity." "Between" includes two-way communications, such that a signal transmitted "between" two entities includes transmitting a signal from a first entity to a second entity, as well as transmitting the signal from the second entity to the first. The originating and terminating entities are any entities capable of transmitting signals to and/or receiving data signals from the intermediate network. For example, the originating entity may be an originating network, and the terminating entity may be a terminating network. An "originating switch" is a switch in the originating network from which signals are transmitted to an "intermediate access switch" of the intermediate network, and a "terminating switch" is a switch of the terminating network to which signals are transmitted by an "intermediate egress switch" of the intermediate network. Typically, the intermediate access switch and the intermediate egress switch will be different switches; however, a single switch may serve as both the intermediate access switch and the intermediate egress switch, in which case transmission "across" the intermediate network refers to transmission across the single switch. The term "originating" is used to indicate which entity requested that a connection be set up, and the terms "originating" and "terminating" do not necessarily limit the direction of data flow. For example, a data signal may be transmitted from an originating entity to a terminating entity and vice versa, and a connection may support two-way communication.

Using the information conveyed by the compression control signal, the intermediate network can determine when compression would be preferable, and compress the data signal in such situations for transmission across the intermediate network. For example, compression is preferably performed where it would save bandwidth without signal degradation.

While the present invention is not limited by particular rules for deciding when to compress a data signal, the decision is preferably made with the goals of (1) avoiding tandem encoding, (2) minimizing the amount of bandwidth used when the data signal is transmitted across the intermediate network, and (3) minimizing the number of transcodings. These goals are sometimes in conflict. For example, a data signal that has been compressed and decompressed before reaching the intermediate network can either be transmitted across the intermediate network without compression, or subjected to tandem encoding. Preferably, such a data signal is not compressed, to avoid tandem encoding. On the other hand, a data signal which is not compressed (or decompressed) outside of the intermediate network is preferably transcoded to a compressed format for transmission across the intermediate network, to save bandwidth. Another situation involves a data signal received and/or transmitted by the intermediate network in a compressed format. Such a signal is preferably transmitted across the intermediate network using such a compressed format. Using existing compression conserves bandwidth without adding to the risk of tandem compression. In addition, when the compression format used to communicate with the originating and/or terminating entities is used for transmission across the intermediate network, the data signal is only transcoded at one switch in the intermediate network (or not at all if the originating entity and terminating entity use the same compressed format), reducing the amount of transcoding that is performed in the intermediate network and conserving network resources.

Preferably, the rules for deciding when to compress a data signal take into account the completeness of the information provided by the compression control signals. For example, compression control signals might provide the entire compression history, past and prospective, of an associated data signal. With this perfect information, an intermediate network could determine when the data signal could be compressed and decompressed within the intermediate network without the risk of tandem encoding.

However, it is likely that the information provided by compression control signals will not be perfect, i.e., complete. For example, compression control signals might provide only a portion of the compression history of the associated data signal, such as the compression format used by the originating and terminating entities to communicate with the intermediate network, without providing information as to whether the data signal is previously or subsequently compressed and decompressed. Also, compression information may be available from only the originating entity or only the terminating entity, but not both. In such situations, it is preferable to avoid any additional compression by the intermediate network, to reduce the risk of tandem compression. However, even imperfect information is still useful. For example, where the compression control signals provide information about the compression formats used by originating and terminating entities for communication with an intermediate network, and the formats are different, the intermediate network is required to transcode from one format to the other. As a result, the most favorable of the two formats can be used for transmission across the intermediate network without creating any additional risk of tandem encoding. Where the compression control signals only provide information about the compression format used to transmit between the intermediate network and the originating entity, that format could be used for transmission across the intermediate network if it is more favorable than the format that would otherwise be used.

Preferably, transcoding is performed at switches, between any pair of formats supported by that switch. The term "codec" refers to an application adapted to code and decode a data signal according to a compression algorithm and the corresponding decompression algorithm. A codec therefore implements a type of transcoding. The term "codec parameter" refers to a parameter included in a compression control signal that identifies the compression format of an associated data signal. Each compression format has an associated bit rate at which it is transmitted across a network, with lower bit rates using less bandwidth. "Access rate" refers to the bit rate of a data signal as it is transmitted from the originating switch to the intermediate access switch, and "egress rate" refers to the bit rate of a data signal as it is transmitted from the intermediate egress switch to the terminating switch. The compression control signal may contain just a single codec parameter. The compression control signal may also contain a plurality of codec parameters. A plurality of codec parameters may be used, for example, for a data signal that is transcoded one or more times as it traverses one or more networks. The compression control signal may contain additional information, such as a parameter describing whether and how the data signal can be compressed without signal degradation. The compression control signal may have a parameter that describes whether and how a data signal is compressed at its source that may be otherwise unknown to the networks. One example of such compression that might otherwise be potentially unknown is the compression of messages by a voice-mail system, if such messages are subsequently forwarded across a network.

The intermediate network may also reject a data signal, when appropriate, to avoid committing unnecessary network resources. Such a rejection preferably occurs as soon as possible to reduce unnecessary use of network resources. Such rejection might occur, for example, when a data signal has been compressed using an algorithm not supported by the intermediate network. As used herein, the term "supported compressed" is used with respect to a particular network, and refers to a data signal that has been compressed using a compression algorithm supported by the switches of that network, i.e., the necessary codec is present in the switches. Similarly, the term "unsupported compressed" refers to a data signal that has been compressed using a compression algorithm not supported by the switches of a particular network. This could occur, for example, if an originating entity uses a compression format not supported by the intermediate network.

The present invention may be applied to telephone networks. For example, the intermediate network may be a long distance telephone network, and the originating and terminating entities may be local telephone networks. In such a situation, the present invention allows voice calls to be transmitted across the long distance telephone network in a compressed format where the compression would save bandwidth, while also providing safeguards against voice quality degradation due to tandem encoding. The intermediate network may also be, for example, a local telephone network connecting a local caller or CPE, such as a private branch exchange (PBX), to a long distance network or to another local caller or CPE.

FIG. 1 shows a network architecture. An intermediate network 110 is connected to an originating network 120 via link 125, and to a terminating network 130 via link 135. On a more detailed level, link 125 connects an intermediate access switch 112 of intermediate network 110 to an originating switch 122 of originating network 120. Link 125 is connected to intermediate access switch 112 at an interface 112a, and to originating switch 122 at an interface 122a. Link 135 connects an intermediate egress switch 114 of intermediate network 110 to a terminating switch 132 of terminating network 130. Link 135 is connected to intermediate egress switch 114 at an interface 114b, and to terminating switch 132 at an interface 132a. Within intermediate network 110, intermediate access switch 112 and intermediate egress switch 114 are connected by a connection 116, which may or may not traverse one or more intermediary switches within intermediate network 110. Connection 116 is connected to intermediate access switch 112 at an interface 112b, and to intermediate egress switch 114 at an interface 114a.

A data signal is transmitted from originating network 120 to terminating network 130 via the following route: The data signal is transmitted from originating switch 122 to intermediate access switch 112 via a connection carried by link 125. The data signal is then transmitted across network 110, from intermediate access switch 112 to intermediate egress switch 114, via connection 116. In a connectionless network, such as a TCP/IP network, "connection" 116 represents the transmission of packets comprising the data signal across network 110, possibly via a variety of different paths. The data signal is then transmitted from intermediate egress switch 114 to terminating switch 132 via a connection carried by link 135. The data signal may also be transmitted from terminating network 130 to originating network 120 via the reverse route.

Networks 110, 120 and 130 may be any type of network over which a data signal may be transmitted. Networks 110, 120 and 130 may include circuit-switched networks, connection oriented packet-switched networks, such as asynchronous transfer mode (ATM) networks, or connectionless packet-switched networks, such as transmission control protocol/Internet protocol (TCP/IP) networks. Networks 110, 120 and 130 may include networks operated by the same carrier, networks operated by different carriers, or customer owned networks, such as a private branch exchange (PBX). Networks 110, 120 and 130 may be different types of networks, provided that appropriate interfaces 112a, 114b, 122a and 132a are provided. The originating network and terminating network need not be the ultimate source and/or destination of a data signal, i.e., a data signal may cross many networks from its ultimate source to its ultimate destination.

Links 125 and 135 can be any type of link adapted to transmit signals between interfaces. For example, links 125 and 135 may be fiber-optic cables, or wire links. Interfaces 112a, 112b, 114a, 114b, 122a and 132a maybe any type of interface adapted to pass data signals across links between switches. These interfaces may be packet-based interfaces, i e., an interface adapted to pass packets having a format indicative of a particular technology. Preferably, packet-based interfaces are used to pass signals between two packet networks. These interfaces may be "native" interfaces, over which packets can be passed in their native form, i.e., as TCP/IP or ATM packets, for example. It is preferable to use native interfaces to pass signals between two packet networks of the same type, i.e., both ATM or both TCP/IP, such that conversion to a different format for the link between networks is not required. These interfaces may be Time Division Multiplex (TDM) interfaces, which are interfaces over which a 64 kbps digital bit stream, such as a voice signal, is transmitted. TDM interfaces typically carry a 64 kbps bit stream in a coding format known as Pulse Code Modulation (PCM), and typically cannot pass ATM cells and IP packets in their native form. While packet-based interfaces are preferable to TDM interfaces for many applications, many existing interfaces are TDM, and the present invention can be practiced using such interfaces. Echo control is preferably provided by the access and egress network when packet-based interfaces are used. The interfaces may be of the same type, or of different types. However, interfaces at either end of a particular link, such as interfaces 112a and 122a at the ends of link 125, are adapted to communicate with each other.

The present invention may be practiced in conjunction with any signaling protocol. Preferably, existing signaling protocols are modified to incorporate a compression control signal into the signals that initially set up connections. Appropriate signaling protocols include BISDN inter carrier interface (B-ICI) for ATM VPNVC connections, Q.2931 for broadband PRI connections, B-ISUP, PNNI, and others. The present invention is not limited by the types of networks, the types of interfaces, or the signaling protocols, because signaling protocols may be modified to provide for the compression control signal.

Handshaking procedures to verify the compression format may be beneficial, and may be implemented at switches in the intermediate network between intermediate access switch 112 and intermediate egress switch 114. However, where such implementation would significantly alter standard control signal flows, such procedures are preferably not implemented, to avoid added complexity, call setup delay, and significant alterations to existing control signal flows.

Figure 2:
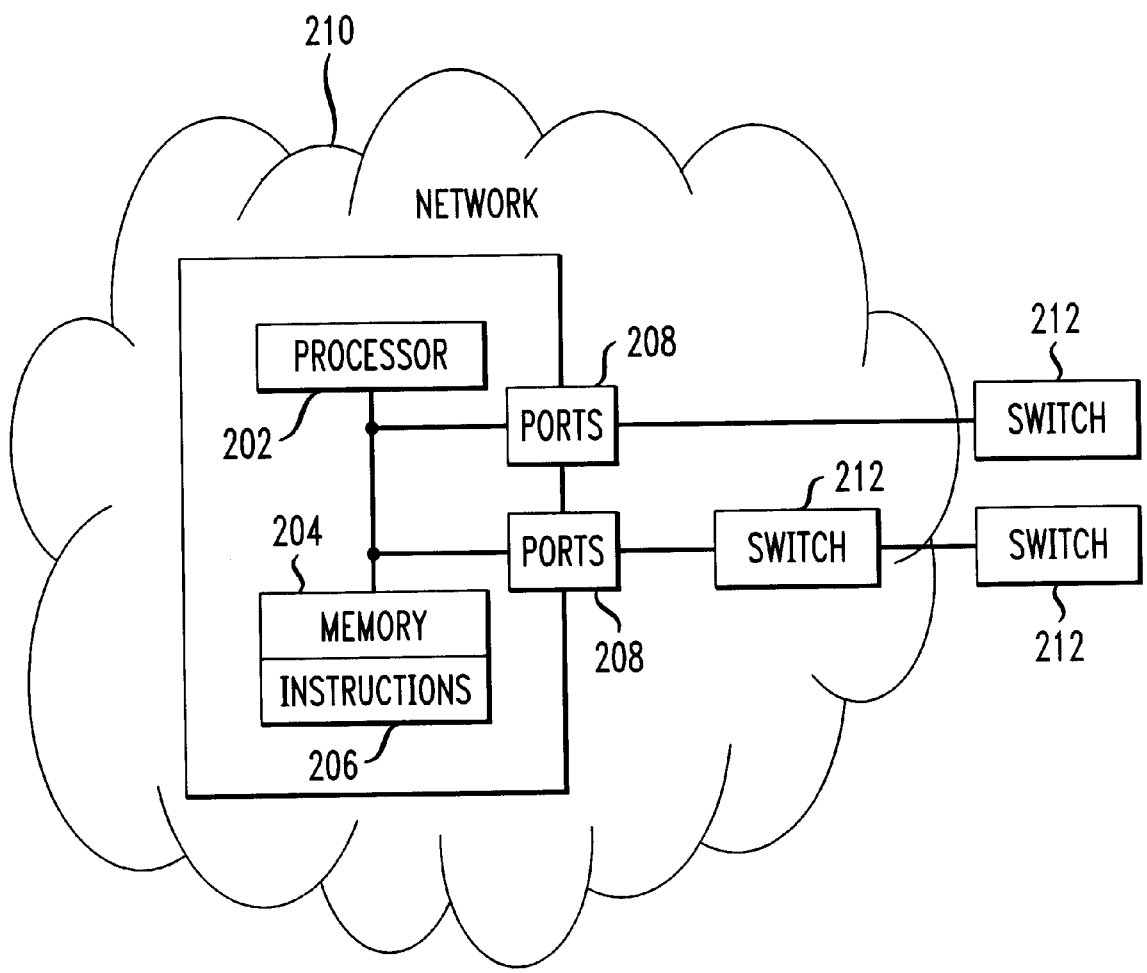
FIG. 2 shows a switch in accordance with an embodiment of the present invention.

FIG. 2 shows a switch 200 in accordance with an embodiment of the present invention. Switch 200 comprises a processor 202, memory 204 adapted to store instructions 206, and one or more ports 208. A port is a virtual interface, much as a connection is a virtual link. Processor 202 is adapted to communicate with memory 204 and to execute instructions 206. Processor 202 and memory 204 are also adapted to communicate with port 208. Switch 200 may be a part of a network 210. Ports 208 are also adapted to communicate with switches 212. Switches 212 may be a part of network 210, or may be outside of network 210. Instructions 206 may be adapted to carry out embodiments of the present invention.

Instructions 206 may also be stored on any storage medium known to the art. Examples of a medium that stores instructions adapted to be executed by a processor include a hard drive, a floppy disk, a Read Only Memory (ROM), a Compact Disk ROM (CD-ROM), flash memory, and any other device that can store digital information. In one embodiment, the instructions are stored on the medium in a compressed and/or encrypted format. Compression of instructions on a storage medium is different from compression of a data signal, and the two should not be confused. As used herein, the phrase "adapted to be executed by a processor" is meant to encompass instructions stored in a compressed and/or encrypted format, as well as instructions that have to be compiled or installed by an installer before being executed by the processor.

Figure 3:
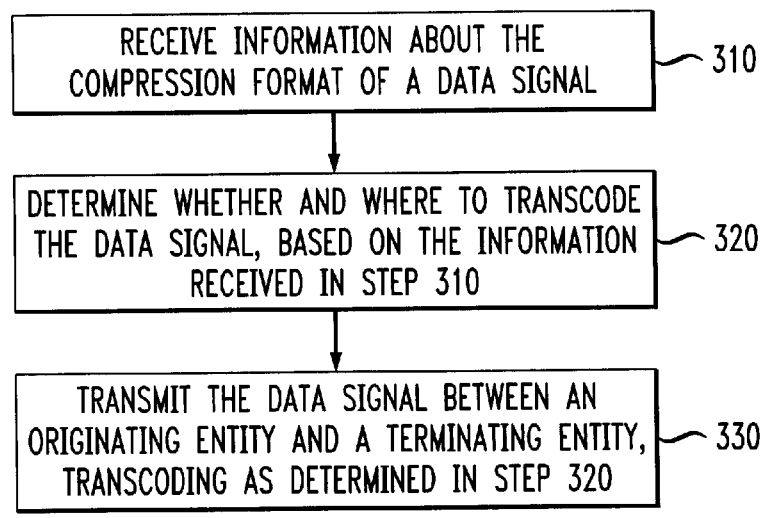
FIG. 3 shows a flowchart describing an embodiment of the present invention as practiced in an intermediate network.

FIG. 3 shows a flowchart describing an embodiment of the present invention as practiced in an intermediate network. In a first step 310, the intermediate network receives information about the compression format of a data signal. Preferably, this information is received as a compression control signal associated with a data signal. For example, the compression control signal could identify the compression format used to transmit the data signal between an originating entity and the intermediate network, or the compression format used to transmit the data signal between a terminating entity and the intermediate network. More than one compression control signal may be received. The decision as to which compression format is used may be made by any entity or network. For example, if the intermediate network is a long distance telephone network, and the originating and terminating entities are local telephone networks, the compression format used to transmit the data signal between the originating entity and the intermediate network is typically determined by the originating entity, and the compression format used to transmit the data signal between the terminating entity and the intermediate network is typically determined by the terminating entity.

In a second step 320, the intermediate network determines whether and where to transcode the data signal within the intermediate network, based on the information about the compression format. For example, the data signal may be transmitted between an originating network 120 and a terminating network 130 via an intermediate network 110, in accordance with FIG. 1. The compression control signal may indicate that a data signal is transmitted between originating network 120 and intermediate network 110 in a format a that is compressed. In such a situation, intermediate network 110 may determine that the data signal should be transmitted across intermediate network 110 in format a. Preferably, the determination of step 320 is made independently at an intermediate access switch and an intermediate egress switch of the intermediate network, with each switch using the same rules to make the determination to reach the same result. To enable such an independent determination, the compression control signal should be transmitted to both the intermediate access switch and the intermediate egress switch. However, such transmission and independent determination is not required. If the compression control signal is not transmitted to both the intermediate access switch and the intermediate egress switch, these two switches may make different determinations. In such a situation, a bidirectional data signal may be transmitted across the intermediate network in one format in one direction, and in a different format in the other direction.

In a third step 330, the data signal is transmitted between the originating entity and the terminating entity, across the intermediate network. Transcoding is performed as determined during step 320.

Figure 4:
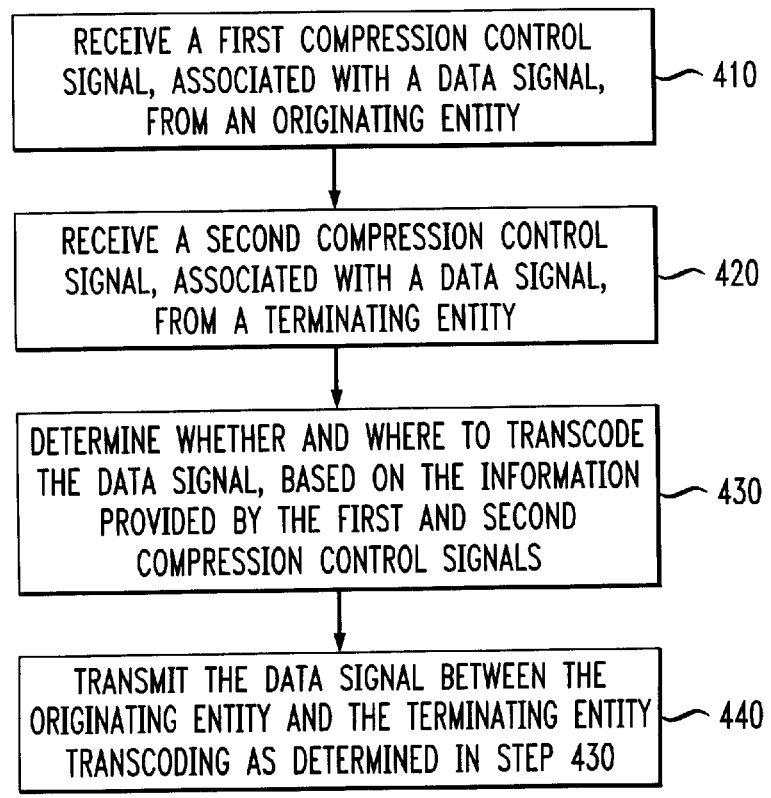
FIG. 4 shows a flowchart describing another embodiment of the present invention as practiced in an intermediate network, where two separate compression control signals are explicitly described.

FIG. 4 shows a flowchart describing another embodiment of the present invention as practiced in an intermediate network, where two separate compression control signals are explicitly described. In a first step 410, the intermediate network receives a first compression control signal associated with a data signal from an originating entity. The first compression control signal provides information about a first compression format which is used to transmit the data signal between the originating entity and the intermediate network. In a second step 420, the intermediate network receives a second compression control signal associated with the data signal from a terminating entity. The terminating entity usually provides the second compression control signal in response to a control signal from the intermediate network that informs the terminating entity that a data signal is about to be transmitted. The second compression control signal provides information about a second compression format which is used to transmit the data signal between the terminating entity and the intermediate network.

In a third step 430, the intermediate network determines whether and where to transcode the data signal within the intermediate network, based on the information provided by the first and second compression-control signals. For example, the first compression control signal may indicate that the first compression format is an uncompressed format, and the second compression control signal may indicate that the second compression format is a compressed format. In such a situation, the intermediate network may determine that transcoding between the compressed format and the uncompressed format should be performed at the intermediate access switch, and that transcoding should not be performed at the intermediate egress switch, such that the data signal is transmitted across the intermediate network in the compressed format. Preferably, the determination of step 430 is made independently at an intermediate access switch and an intermediate egress switch of the intermediate network, with each switch using the same information and the same rules to make the same determination. However, such independent determination is not required.

In a fourth step 440, the data signal is transmitted between the originating entity and the terminating entity, across the intermediate network. Transcoding is performed as determined during step 430. The data signal is transmitted between the originating entity and the intermediate network using the first compression format, and between the terminating entity and the intermediate network using the second compression format.

Specific representative embodiments of the present invention will now be described. These representative embodiments are provided for illustrative purposes, and the invention is not intended to be limited to the methods, materials, conditions, process parameters, apparatus and the like specifically recited herein.

EXAMPLES

Example 1

Rules for compression of voice signals in an intermediate network between an originating network and a terminating network:

Where voice signals are transmitted between the originating network and the intermediate network using compression format a, and between the terminating network and the intermediate network using compression format b, the intermediate network may determine the compression format that should be used to transmit a voice signal across the intermediate network, so as to reduce bandwidth usage without signal degradation, using the following rules:

1. If either a or b is not supported by the intermediate network: Reject the call.
2. If either or both of a and b is a compressed format, both a and b are supported, and a has a lower bit rate than b: Do not transcode at the intermediate access switch, and transmit the voice signal across the intermediate network in compression format a. Transcode between formats a and b at the intermediate egress switch.
3. If either or both of a or b is a compressed format, both a and b are supported, and b has a lower bit rate than a: Transcode between formats a and b at the intermediate access switch, and transmit the voice signal across the intermediate network in compression format b. Do not transcode at the intermediate egress switch.
4. If a and b are different compressed formats having the same bit rate, follow step 2 as though the criteria for that step had been satisfied (step 3 could also be used; however, the choice between step 2 and step 3 should be made in a consistent manner). If a and b are the same compressed format, transmit the voice signal across the intermediate network without transcoding.
5. If a and b are both uncompressed: If the signal is not compressed at any other point, transcode between the uncompressed format and a compressed format at the intermediate access switch and the intermediate egress switch, and use the compressed format for transmission across the intermediate network. If the signal is compressed at some point outside the intermediate network, or if it is not known whether the signal is compressed at such a point, transmit the signal across the intermediate network in uncompressed format, without transcoding.

These rules are set out in more detail in Table 1, which identifies preferred rules to be followed for transmitting voice signals across an intermediate network. In Table 1, the first column, labeled "Access Switch," describes a format a used to transmit a data signal between the originating switch and the intermediate access switch. The second column, labeled "Egress Switch," describes a format b used to transmit a data signal between the terminating switch and the intermediate egress switch. A * in a column is a wildcard that matches any possible value for that field.

TABLE 1

Compression Rules

| Access Switch (format a) | Egress Switch (format b) | Other Compression | Compression Rule |
|---|---|---|---|
| unsupported compressed | * | * | reject call |
| * | unsupported compressed | * | reject call |
| uncompressed | uncompressed | no | carry in compressed format; transcode at access and egress switches |
| uncompressed | uncompressed | yes | carry in uncompressed format |
| supported compressed | uncompressed | * | carry in format a; transcode at egress switch |
| uncompressed | supported compressed | * | carry in format b; transcode at access switch |
| supported compressed | supported compressed | * | if a = b, carry in format a; if access rate > egress rate, carry in format b and transcode at access switch; if access rate < egress rate, carry in format a and transcode at egress switch |

As used herein, "other compression" refers to the compression of a data signal prior to entering or after leaving the intermediate network, other than the compression, if any, used to achieve format a or format b. Table 1 takes into account whether perfect information is available. For example, if information regarding "other compression" is not available, the decision should be made as if there is "other compression," to reduce the chance of tandem encoding. Even if perfect information is not available, formats a and b can be used for transmission across the intermediate network without adding to the chance of tandem encoding, because these formats are already present at the access switch and the egress switch, respectively.

The rules of Table 1 can be used by both the access switch and the egress switch to decide whether and how to transcode a signal. Also, where the rules indicate that a signal should be transcoded at a particular switch, the transcoding can be applied to a bidirectional signal, if two-way communication is supported. For example, when format a is supported compressed, and format b is uncompressed, the decision is to "carry in format a; transcode at egress switch." In such a situation, the part of a bidirectional data signal arriving at the access switch from the originating entity would be in format a, and would be transmitted to the egress switch in format a, without transcoding. Upon arrival at the egress switch in format a, this part of the data signal would be transcoded to an uncompressed format for transmission to the terminating entity. The part of the data signal arriving at the egress switch from the terminating entity would be in an uncompressed format, and would be transcoded to format a for transmission to the access switch. Upon arrival at the access switch in format a, this part of the data signal would be transmitted to the originating entity in format a, without transcoding.

The rules of Table 1 apply to situations where compression information is communicated between the intermediate access switch and the intermediate egress switch, i.e., both switches know that format a is used for transmitting the data signal between the originating entity and the intermediate access switch, and that format b is used for transmitting the data signal between the terminating entity and the intermediate egress switch. The invention may also be practiced in other situations, such as where only the intermediate access switch knows that format a is used for transmitting the data signal between the originating entity and the intermediate access switch, and only the intermediate egress switch knows that format b is used for transmitting the data signal between the terminating entity and the intermediate egress switch. In such a situation, different rules would apply.

Moreover, the data signal might be transmitted from the intermediate access switch to the intermediate egress switch in a format different from that used to transmit the data signal from the intermediate egress switch to the intermediate access switch.

Example 2 provides procedures for use with an intermediate network comprised of ATM switches in a telephone network. This example illustrates the incorporation of a compression control signal into existing ATM signaling protocols used to set up connections through an ATM network, which may significantly increase the efficiency with which the ATM network uses bandwidth. However, it is understood that the present invention is not limited by this example. For example, compression control signals may be used in a different way in an ATM network, or used in other types of networks having different signaling protocols.

Figure 5:
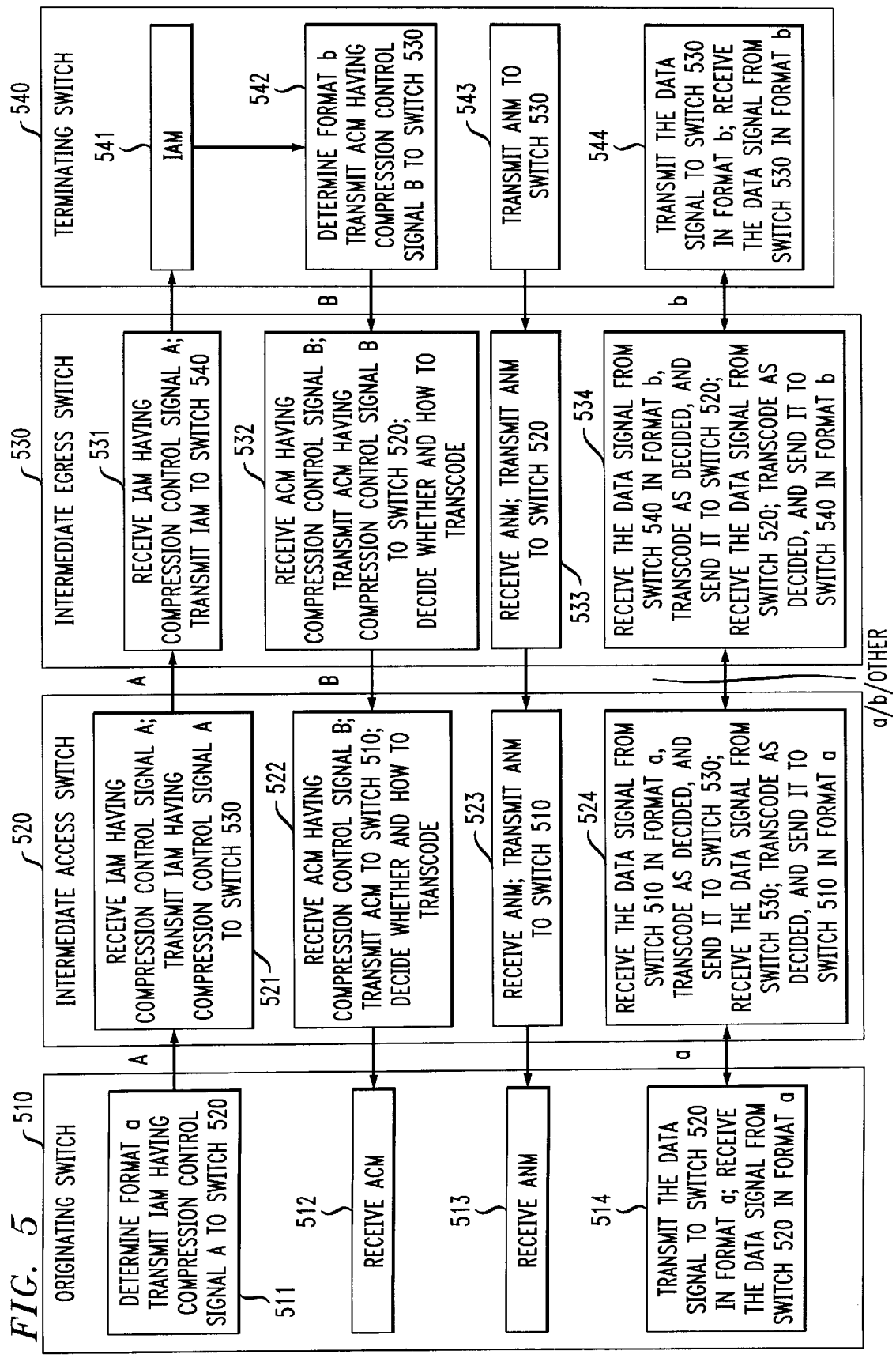
FIG. 5 shows a flowchart describing an embodiment of the invention as practiced in an originating ATM network, an intermediate ATM network, and a terminating ATM network.

FIG. 5 illustrates Example 2, and shows how the Procedures at an Originating Switch, Procedures at an Intermediate Access Switch, Procedures at an Intermediate Egress Switch, and Procedures at a Terminating Switch are interrelated. Steps 511, 512, 513 and 514 occur at an originating switch 510; steps 521, 522, 523 and 524 occur at an intermediate access switch 520; steps 531, 532, 533 and 534 occur at an intermediate egress switch 530; and steps 541, 542, 543 and 544 occur at a terminating switch 540. The arrows in FIG. 5 illustrate one order in which these steps may be executed.

Example 2

Procedures at an Originating Switch 510 in an Originating ATM Network

Step 511: Determine a compression format a for a data signal to be transmitted between intermediate access switch 520 of the intermediate network and originating switch 510. Transmit an outgoing Initial Address Message (IAM) message to intermediate access switch 520, in accordance with conventional ATM protocols for establishing a virtual connection, and including a compression control signal having a codec parameter A indicating that the data signal will be transmitted between intermediate access switch 520 and originating switch 510 using compression format a.

Step 512: Receiving an Address Complete Message (ACM) from intermediate access switch 520 indicating that the virtual connection is established (i.e., the phone at the other end of the connection is ringing), in accordance with conventional ATM protocols for establishing a virtual connection.

Step 513: Receiving an ANswer Message (ANM) from intermediate access switch 520, in accordance with conventional ATM protocols for establishing a virtual circuit, indicating that the user at the other end of the connection has answered the phone.

Step 514: Transmit the data signal to intermediate access switch 520 using compression format a, and receive the data signal from intermediate access switch 520 using compression format a.

Procedures at an Intermediate Access Switch 520 in an Intermediate ATM Network

Step 521: Receive an IAM from originating switch 510, in accordance with conventional ATM protocols for establishing a virtual circuit, and including a compression control signal having a codec parameter A. If a is a format not supported by the intermediate network, reject the call by sending a RELease (REL) message to switch 510. Otherwise, store the codec parameter A, and transmit an outgoing IAM signal to intermediate egress switch 530, in accordance with conventional ATM protocols for establishing a virtual circuit, and including a compression control signal having codec parameter A.

Step 522: Receive an ACM from intermediate egress switch 530, in accordance with conventional ATM protocols for establishing a virtual circuit, and including a compression control signal having a codec parameter B indicating that the data signal will be transmitted between intermediate egress switch 530 and terminating switch 540 using compression format b. Transmit an ACM message to originating switch 510 in accordance with conventional ATM protocols for establishing a virtual circuit. Decide whether and how to transcode, using rules such as those in Table 1. Intermediate egress switch 530 may make the same decision based on the same information (compression control signals A and B). Alternatively, one switch may make the decision as to how to transcode, and communicate the decision to the other switch.

Step 523: Receive an ANM from switch 530, and transmit an ANM to switch 510, in accordance with conventional ATM protocols for establishing a virtual circuit.

Step 524: Receive the data signal from originating switch 510 in compression format a, transcode the data signal per the decision made in step 522, and send it to intermediate egress switch 530 in the compression format decided upon. This format may be format a, format b, or another format. Receive the data signal from intermediate egress switch 530 in a compression format decided upon, transcode the signal per the decision, and send it to originating switch 510 in compression format a.

Procedures at an Intermediate Egress Switch 530 of the Intermediate ATM Network

Step 531: Receive an IAM from intermediate access switch 520 in accordance with conventional ATM protocols for establishing a virtual circuit, and including a compression control signal having a codec parameter A. Store the codec parameter A, and transmit an outgoing IAM signal to terminating switch 540, in accordance with conventional ATM protocols for establishing a virtual circuit.

Step 532: Receive an ACM from terminating switch 540, in accordance with conventional ATM protocols for establishing a virtual circuit, and including a compression control signal having a codec parameter B indicating that the data signal will be transmitted between intermediate egress switch 530 and terminating switch 540 using compression format b. Transmit an ACM message to intermediate access switch 520 in accordance with conventional ATM protocols for establishing a virtual circuit, and including a compression control signal having a codec parameter B. Decide whether and how-to transcode, using rules such as those in Table 1.

Step 533: Receive an ANM from switch 540, and transmit an ANM to switch 520, in accordance with conventional ATM protocols for establishing a virtual circuit.

Step 534: Receive the data signal from terminating switch 540 in compression format b, transcode these signals per the decision made in step 532, and send it to intermediate access switch 520 in the compression format decided upon. This format may be format a, format b, or another format. Receive the data signal from intermediate access switch 520 in the compression format decided upon, transcode the data signal per the decision, and send it to terminating switch 540 in compression format b.

Procedures at a Terminating Switch 540

Step 541: Receive an IAM from intermediate egress switch 530 in accordance with conventional ATM protocols for establishing a virtual circuit.

Step 542: Determine a compression format b for the data signal to be sent between intermediate egress switch 530 of the intermediate network and terminating switch 540. Transmit an ACM message to intermediate egress switch 530, in accordance with conventional ATM protocols for establishing a virtual circuit, and including a compression control signal having a codec parameter B indicating that the data signal will be transmitted between intermediate egress switch 530 and terminating switch 540 using compression format b.

Step 543: When the user answers the telephone (or when an ANM is received from a subsequent network in the connection), transmit an ANM to intermediate egress switch 530.

Step 544: Transmit the data signal to intermediate egress switch 530 using compression format b, and receive the data signal from intermediate egress switch 530 using compression format b.

The steps need not be performed in the exact way and order shown in FIG. 5. For example, intermediate egress switch 530 may decide whether and how to transcode at any point after compression control signals A and B are received, and may defer the decision until the point the data signal arrives at intermediate egress switch 530. However, the order shown in FIG. 5 is a preferred order.

The originating switch and the terminating switch may connect to the same switch of the intermediate network, in which case the intermediate access switch is also the intermediate egress switch. In such a situation, Procedures at an Intermediate Access Switch 520 and Procedures at an Intermediate Egress Switch 530 may be combined, and steps relating to communication between those two switches may be omitted.

As described, the procedures of Example 2 inform the switches of the intermediate network as to the compression format of the data signal in the originating network, intermediate network, and terminating network, but do not provide any information to the originating network or terminating network. Codec parameters may also be sent to the originating and terminating networks, and those networks may choose compression formats based upon the codec parameters. For example, codec parameter A may be sent to the terminating network, which may choose to use compression format a, possibly avoiding the need for transcoding in the intermediate network.

Several embodiments of the present invention are specifically illustrated and/or described herein. However, it will be appreciated that modifications and variations of these embodiments are encompassed by the above teachings as well as the attached claims.

What is claimed is:

1. A method of transmitting a data signal across an intermediate network, comprising the steps of:
   (a) receiving a compression control signal associated with the data signal, the compression control signal providing information about a first compression format of the data signal;
   (b) determining a second compression format and at least one location to transcode the data signal within the intermediate network, based on the information about the first compression format of the data signal; and
   (c) transmitting the data signal across the intermediate network, the data signal being transcoded, at the location within the intermediate network, using the second compression format.

2. The method of claim 1, wherein the compression control signal is included as a header on the data signal.

3. The method of claim 1, wherein the compression control signal is included as a part of a signal separate from the data signal.

4. The method of claim 3, wherein the compression control signal is included as a part of a control signal that sets up a connection over which the data signal will be transmitted.

5. The method of claim 1, wherein the intermediate network is an asynchronous transfer mode (ATM) network.

6. The method of claim 1, wherein the intermediate network is a transmission control protocol/Internet protocol (TCP/IP) network.

7. A method of transmitting a data signal across an intermediate network, comprising the steps of:
   (a) receiving from an originating entity a first compression control signal, associated with the data signal, the first compression control signal providing information about a first compression format in which the originating entity communicates with the intermediate network;
   (b) receiving from a terminating entity a second compression control signal, associated with the data signal, the second compression control signal providing information about a second compression format in which the terminating entity communicates with the intermediate network;
   (c) determining a most favorable compression format and at least one location to transcode the data signal within the intermediate network, based on the information provided by the first and second compression control signals; and
   (d) transmitting the data signal, between the originating entity and the terminating entity, the data signal being transcoded, at the location within the intermediate network, using the most favorable compression format.

8. The method of claim 7, wherein the originating entity is an originating network and the terminating entity is a terminating network.

9. The method of claim 7, wherein the first compression control signal is included as a header on the data signal.

10. The method of claim 7, wherein the first compression control signal is included as a part of a signal separate from the data signal.

11. The method of claim 10, wherein the first compression control signal is included as a part of a control signal that sets up a connection along which the data signal will be transmitted.

12. The method of claim 7, wherein the second compression control signal is included as a header on the data signal.

13. The method of claim 7, wherein the second compression control signal is included as a part of a signal separate from the data signal.

14. The method of claim 13, wherein the second compression control signal is included as a part of a control signal that sets up a connection along which the data signal will be transmitted.

15. The method of claim 7, wherein:
   the first compression control signal is included in an Initial Address Message transmitted by the originating entity to the intermediate network; and
   the second compression control signal is included in an Address Complete Message transmitted by the terminating entity to the intermediate network.

16. The method of claim 7, wherein:
   the first compression control signal is included in a setup signal transmitted by the originating entity to the intermediate network; and
   the second compression control signal is included in an alerting signal transmitted by the terminating entity to the intermediate network.

17. The method of claim 7, wherein the intermediate network is an asynchronous transfer mode (ATM) network.

18. The method of claim 7, wherein the intermediate network is a transmission control protocol 1 Internet protocol (TCP/IP) network.

19. The method of claim 7, wherein the data signal is transmitted across the intermediate network using a compression format selected from the group consisting of the first compression format and the second compression format.

20. The method of claim 19, wherein the compression format selected uses an amount of bandwidth not greater than that used by the compression format not selected.

21. A transcoded data signal generated according to the process of:
  receiving, at an intermediate network, a compression control signal associated with a data signal, the compression control signal providing information about a first compression format of the data signal;
  determining a second compression format and at least one location to transcode the data signal within the intermediate network, based on the information about the first compression format of the data signal; and
  transmitting the transcoded data signal between an originating network and a terminating network, the data signal being transcoded into the transcoded data signal at the location within the intermediate network using the second compression format.

22. A method for transcoding a data signal within an intermediate network, comprising:
  receiving, from a first network, a first compression control signal having a first bit rate;
  receiving, from a second network, a second compression control signal having a second bit rate;
  determining a third bit rate for the data signal, the third bit rate having a bit rate equal to, or less than, the lesser of the first bit rate and the second bit rate;
  determining at least one location within the intermediate network, based on the third bit rate, to compress the data signal;
  transcoding the data signal at the location within the intermediate network using the third bit rate; and
  transmitting the transcoded data signal between the first network and the second network.

23. The method of claim 22, wherein said determining at least one location within the intermediate network includes selecting a location at a network boundary between the intermediate network and the second network if the third bit rate has a bit rate equal to the first bit rate.

24. The method of claim 22, wherein said determining at least one location within the intermediate network includes selecting a location at a network boundary between the intermediate network and the first network if the third bit rate has a bit rate equal to the second bit rate.

25. An intermediate network adapted to transmit a data signal between an originating network and a terminating network, comprising:
  an intermediate access switch connected to an originating switch of the originating network via a first link;
  an intermediate egress switch connected to the intermediate access switch by a connection within the intermediate network, and connected to a terminating switch of the terminating network via a second link;
  wherein
  the intermediate network is adapted to receive a compression control signal associated with a data signal, the compression control signal providing information about a first compression format of the data signal;
  the intermediate network is adapted to determine a second compression format and at least one location to transcode the data signal within the intermediate network, based on the compression control signal;
  the intermediate access switch is adapted to transmit the data signal between the intermediate access switch and the originating switch via the first link;
  the intermediate network is adapted to transmit the data signal across the intermediate network via the connection, the data signal being transcoded as determined; and
  the intermediate egress switch is adapted to transmit the data signal between the intermediate egress switch and the terminating switch via the second link.

26. A switch in an intermediate network for processing a data signal, comprising:
  a. a memory that stores instructions for:
    i. receiving a compression control signal, associated with the data signal, the compression control signal providing information about a first compression format of the data signal;
    ii. determining a second compression format and at least one location to transcode the data signal within the intermediate network, based on the compression control signal; and
    iii. transmitting the data signal across the intermediate network, the data signal being transcoded, at the location within the intermediate network, using the second compression format;
  b. a processor adapted to communicate with the memory and to execute the instructions stored by the memory; and
  c. a port adapted to communicate with the processor, the memory, and the intermediate network.

27. The switch of claim 26, wherein the compression control signal is included as a header on the data signal.

28. The switch of claim 26, wherein the compression control signal is included as a part of a signal separate from the data signal.

29. The switch of claim 28, wherein the compression control signal is included as a part of a control signal that sets up a connection along which the data signal will be transmitted.

30. The switch of claim 26, wherein the intermediate network is an asynchronous transfer mode network.

31. The switch of claim 26, wherein the intermediate network is a TCP/IP network.

* * * * *

UNITED STATES PATENT AND TRADEMARK OFFICE
CERTIFICATE OF CORRECTION

PATENT NO.   : 6,490,278 B1  
DATED         : December 3, 2002  
INVENTOR(S)  : Steven M. Michelson and Joshua Hal Rosenbluth It is certified that error appears in the above-identified patent and that said Letters Patent is hereby corrected as shown below:

Column 17,
Line 4, "1" is replaced with -- / --.

Signed and Sealed this

Thirteenth Day of May, 2003

JAMES E. ROGAN
*Director of the United States Patent and Trademark Office*